No. 697,843. Patented Apr. 15, 1902.
C. H. HOWLAND-SHERMAN.
MAIN GUN TURRET.
(Application filed Dec. 18, 1900.)
(No Model.) 7 Sheets—Sheet 2.

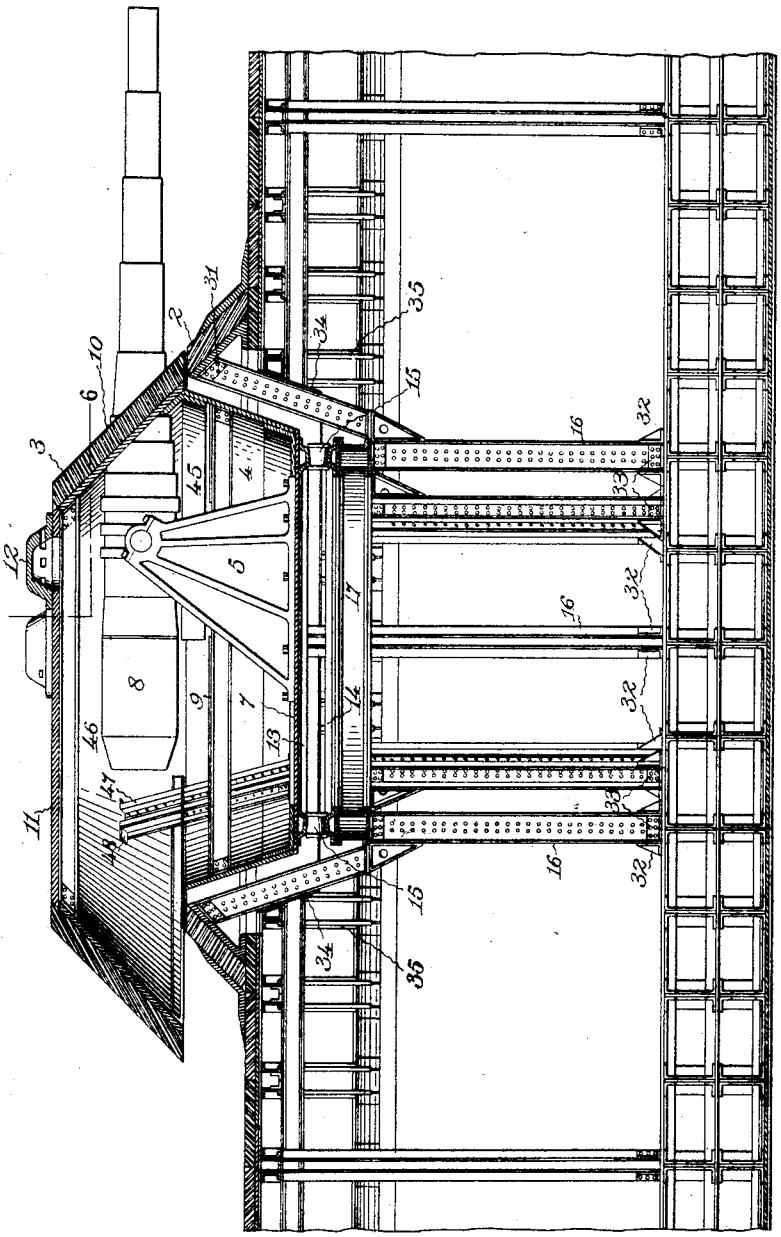

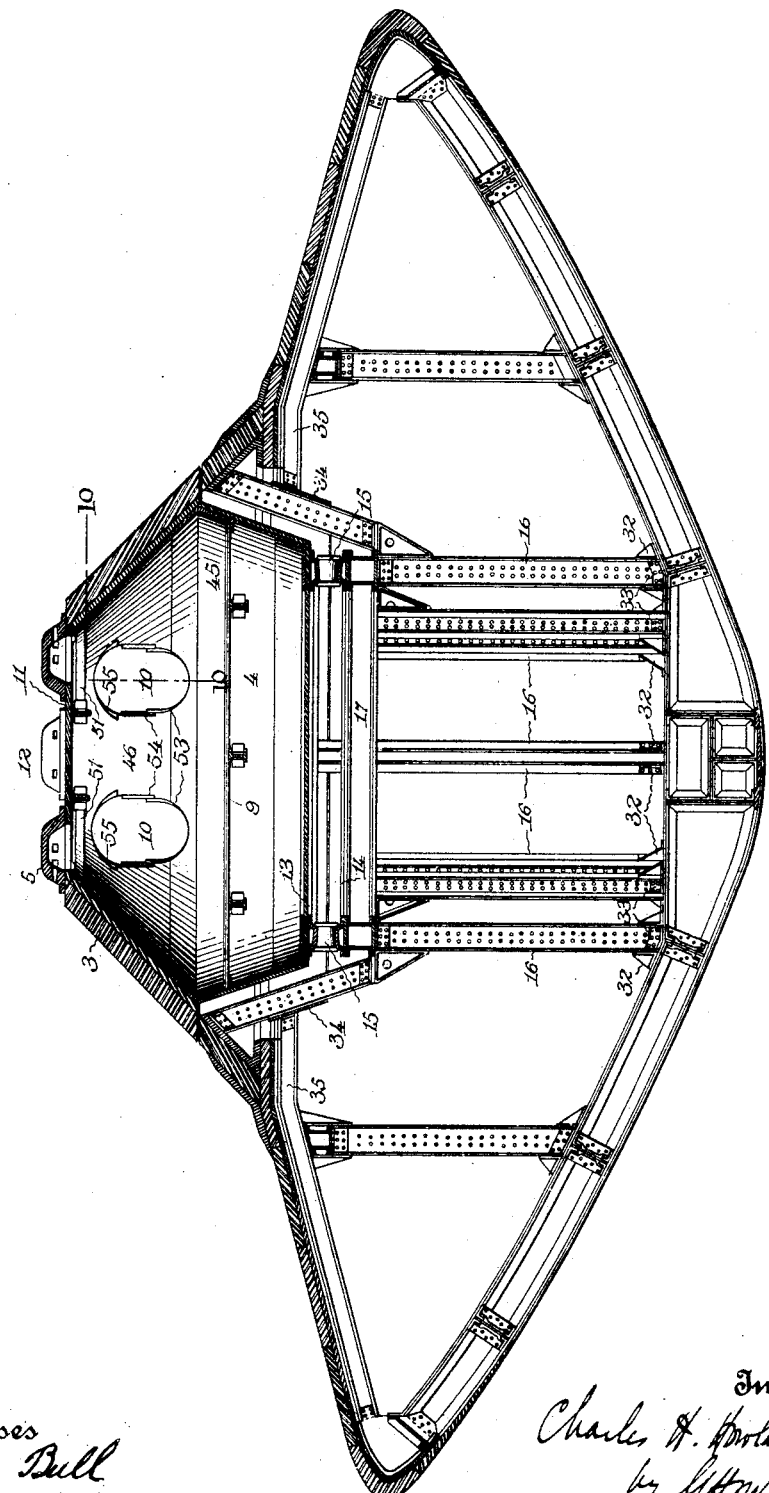

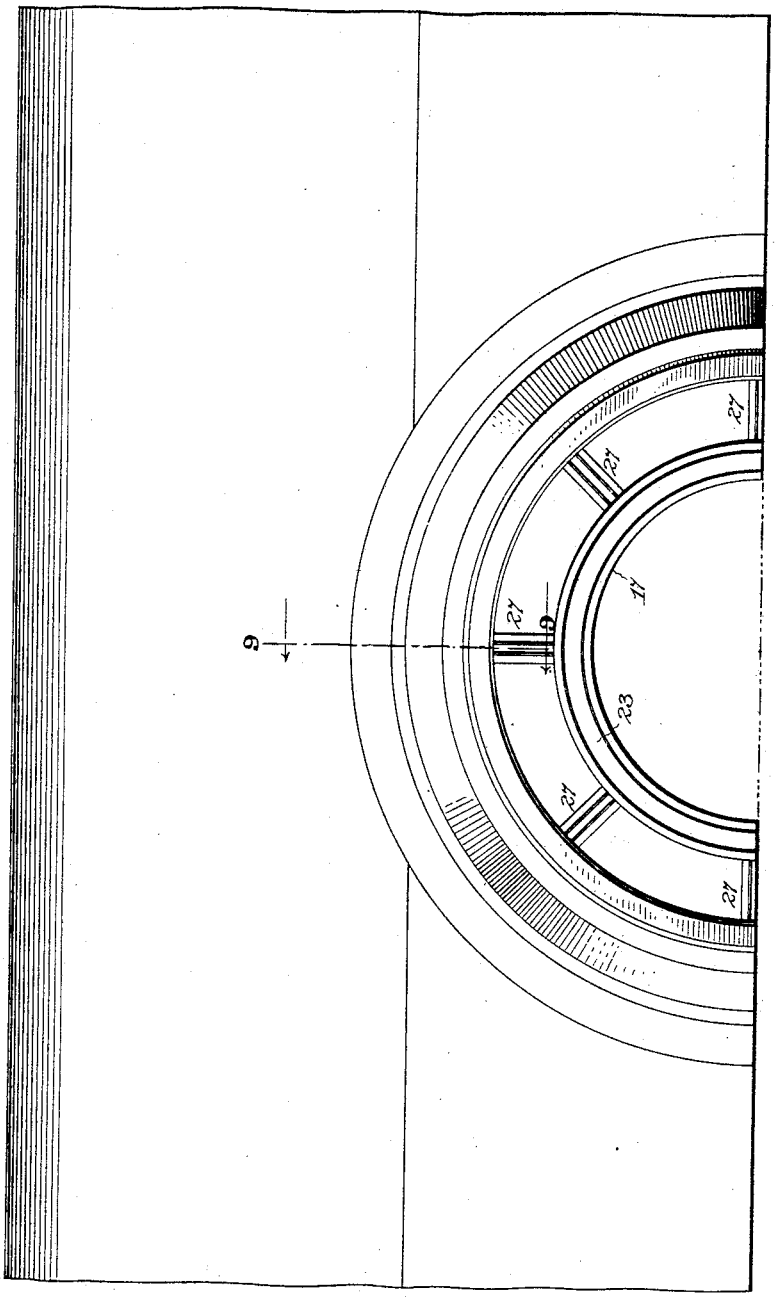

No. 697,843.  
Patented Apr. 15, 1902.
C. H. HOWLAND-SHERMAN.  
MAIN GUN TURRET.  
(Application filed Dec. 18, 1900.)
(No Model.)  
7 Sheets—Sheet 6.
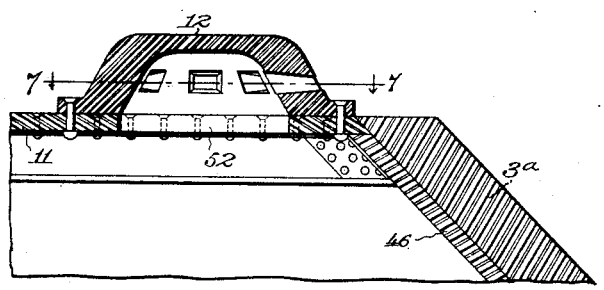
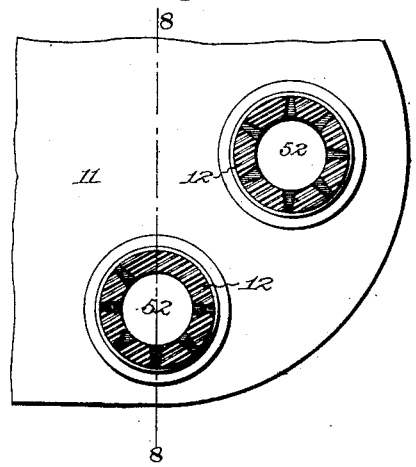
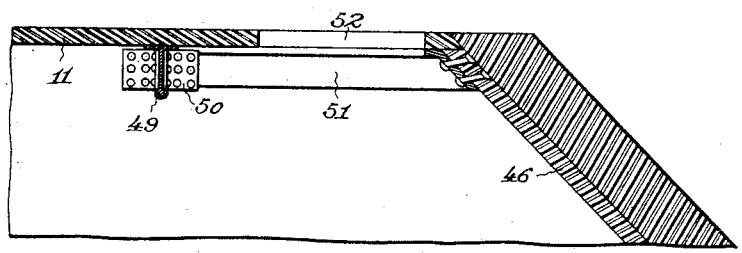
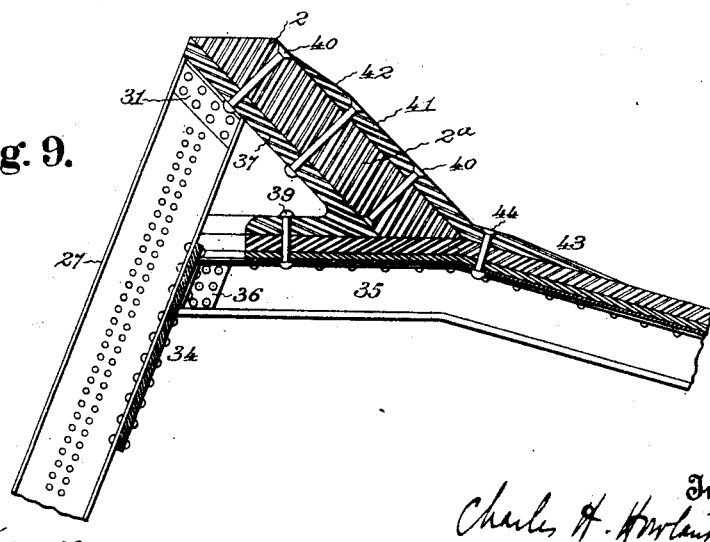
Witnesses  
C. B. Bull  
E. L. Stickney
Inventor  
Charles H. Howland-Sherman  
by G. H. W. T. Howard  
Attorneys.

No. 697,843. Patented Apr. 15, 1902.
C. H. HOWLAND-SHERMAN.
MAIN GUN TURRET.
(Application filed Dec. 18, 1900.)
(No Model.) 7 Sheets—Sheet 7.

Witnesses
C. B. Bull
E. G. Stickney

Inventor
Charles H. Howland-Sherman,
by G. H. W. T. Howard
Attorneys.

THE NORRIS PETERS CO., PHOTO-LITHO., WASHINGTON, D. C.

UNITED STATES PATENT OFFICE.

CHARLES H. HOWLAND-SHERMAN, OF WASHINGTON, DISTRICT OF COLUMBIA, ASSIGNOR OF ONE-FOURTH TO GEORGE H. HOWARD, OF WASHINGTON, DISTRICT OF COLUMBIA, AND SAMUEL G. B. COOK, OF LONDON, ENGLAND.

MAIN GUN-TURRET.

SPECIFICATION forming part of Letters Patent No. 697,843, dated April 15, 1902.

Application filed December 18, 1900. Serial No. 40,272. (No model.)

*To all whom it may concern:*

Be it known that I, CHARLES H. HOWLAND-SHERMAN, a citizen of the United States, residing at Washington, in the District of Columbia, have invented certain new and useful Improvements in Main Gun-Turrets, of which the following is a full, clear, and exact description, reference being had to the accompanying drawings, forming part thereof.

My invention relates to improvements in main battery-turrets, and is designed to accomplish the following principal objects, viz: first, to provide a turret with more universal and mathematically correct deflecting properties; second, to furnish a construction enabling more ready ventilation from the fumes of powder discharges; third, to provide means for directly referring the stresses of external impacts along approximately normal lines of force composition to points where they are distributed to and absorbed by the adjacent sustaining hull structure; fourth, to provide a light bed structure for the mount which shall be adequate for absorbing the recoil shocks of the guns, and thus take the place of a heavy gun-bed, whose mass inertia has been customarily depended upon for that purpose, and, fifth, to provide special means for sustaining the weight of the mount and turret-bed which shall also act as media for distributing shocks from the turret simultaneously to and over the deck and keel structures of the hull. These objects I accomplish by the mechanism illustrated in the accompanying drawings, hereby made a part of this specification, in which—

Figure 1:
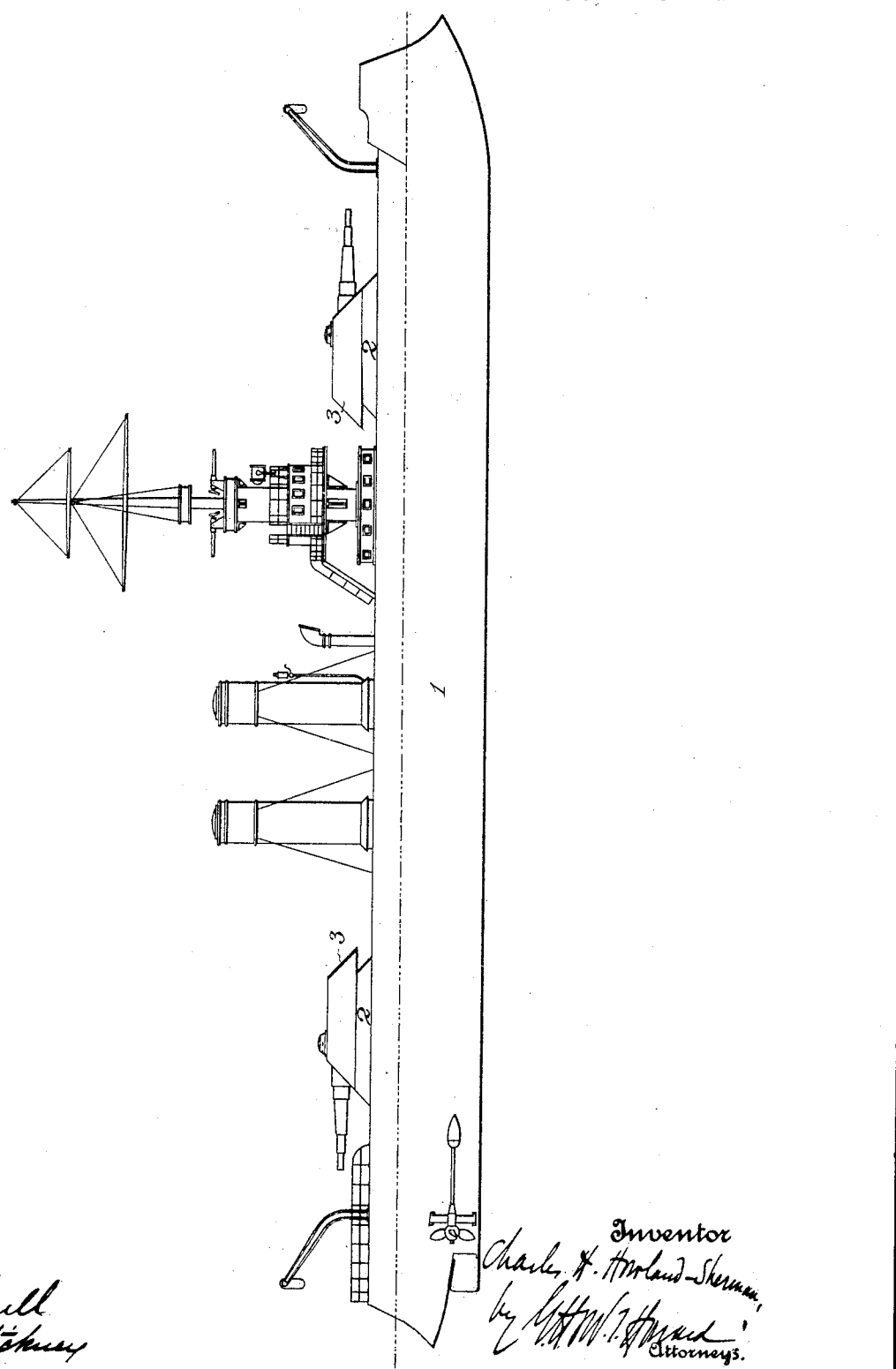
Figure 2:
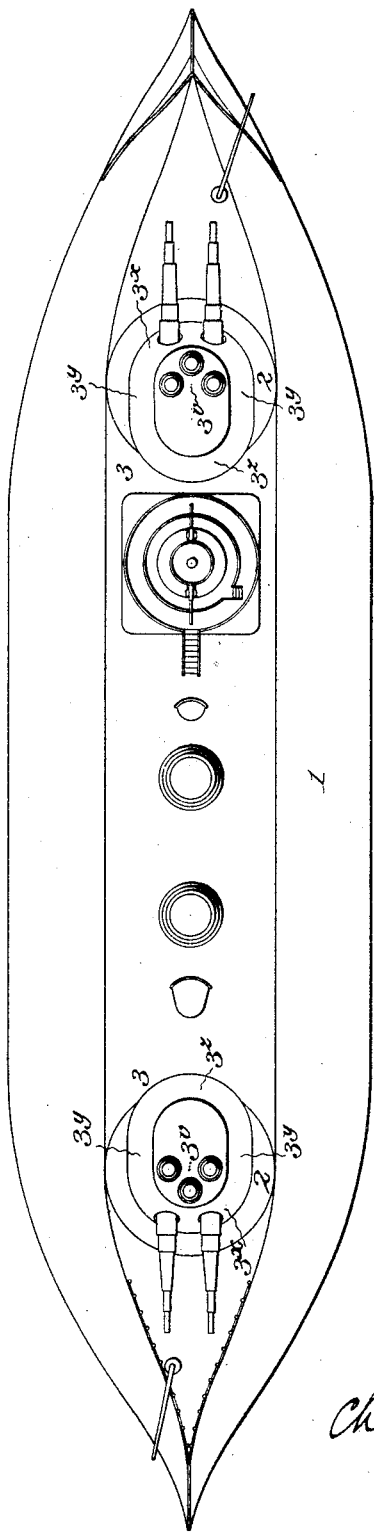
Figure 10:
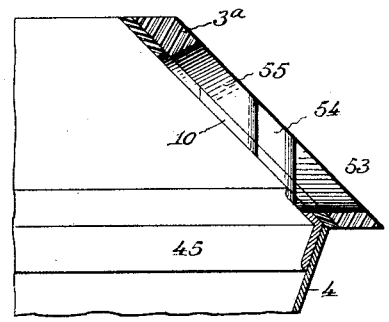
Figure 11:
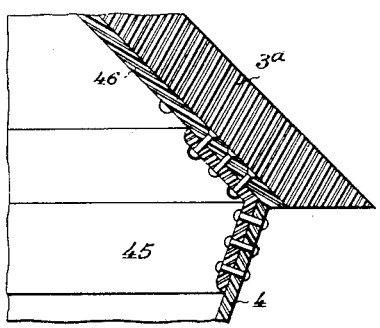
Figure 12:
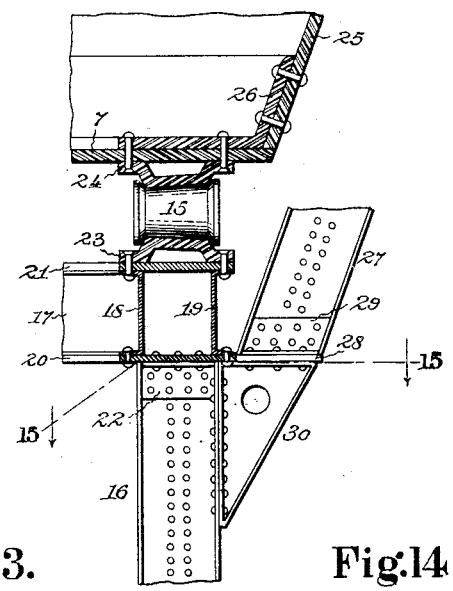
Figure 13:
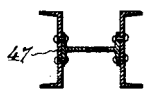
Figure 14:
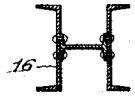
Figure 15:
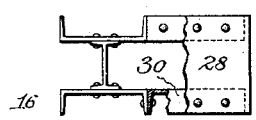

Figure 1 is a side elevation of a third-rate cruiser carrying two main battery-turrets constructed upon this system. Fig. 2 is a top plan view of the vessel shown in elevation in Fig. 1. Fig. 3 is a central longitudinal section taken through the hull of the vessel at the location of one of these turrets, showing the mount with its guns in position. Fig. 4 is a transverse section taken through the hull at the location of such a turret with the guns removed to demonstrate the peculiar formation of ports adopted in my invention. Fig. 5 is a top plan view of one-half of the turret-bed and turret-pit framework with the mount removed to show its arrangement. Fig. 6 is an enlarged section, taken on the line 6 6 of Fig. 3, through the top of the turret, showing details of the backing-plates, roof structure, and one of the conning-towers. Fig. 7 is a partial top plan view taken on the line 7 7 of Fig. 6 and looking in the direction of the arrows to show the plan and arrangement of the sights of the conning-towers. Fig. 8 is a transverse section taken through the top of the turret on the line 8 8 of Fig. 7, with one of the conning-towers removed and showing details of the roof angling, armor, and backing-plate. Fig. 9 is an enlarged detail of the turret-base shown in general view in Fig. 3 and taken on the line 9 9 of Fig. 5 looking in the direction of the arrows and showing the methods of integrating its parts with each other and with the deck and turret framings, respectively. Fig. 10 is an enlarged detail of one of the ports, taken on the line 10 10 of Fig. 4. Fig. 11 is a detail of the turret-elbow, showing the special method of assembling its reversely-conical structure by interior angles. Fig. 12 is an enlarged detail of the turret-pit ring, tracks, rolls, and base of mount. Fig. 13 is a transverse section of one of the turret-pit stays. Fig. 14 is a transverse section of one of the turret-pit struts and is a like true section of one of the supporting-columns 16 of the turret-pit. Fig. 15 is a detail taken on the line 15 15 of Fig. 12 looking in the direction of the arrows and exhibiting the manner in which the gussets are attached to the tops of the supporting-columns and the flanges of the turret-pit ring are mounted upon the gussets to form the steppings of the turret-pit struts.

Similar numerals of reference indicate similar parts throughout the several views.

Referring to Figs. 1 and 2, 1 may represent generally the hull, having secured thereto the turret-base 2, upon which is mounted the main battery-turret 3 in a manner to be hereinafter more fully described. The general elevation of the two turrets shown in Fig. 1 clearly indicates that their leading external difference from turrets in familiar use is that they represent a homogeneous receding conical contour as regards the front half of the battery from deck upward, in whatsoever lateral direction they may be trained. Fig. 2 shows that the turret proper is a composite pyramido-conical structure formed by the tangent interjection of the frustum of a pyramid $3^y$ of equal angularity to the turret-base 2 between two semifrusta of cones $3^x$ $3^z$, homogeneous with the conical frustum of said turret-base 2. The said pyramido-conical turret 3 is so mounted upon the conical turret-base 2 that its center of revolution $3^v$ coincides with the vertical axis of the forward of said semifrusta $3^x$, which latter is therefore brought to face flush with the conical base 2 for one hundred and eighty degrees—viz., to its tangency with the pyramidal frustum $3^y$—in whatever position in lateral train the battery be directed. It will also be noticed that the tangency of the turret 3 with the turret-base 2 is likewise limited to the point of tangency of the forward semifrustum $3^x$ with the pyramidal frustum $3^y$.

The interior construction of my turret and its framing is clear from Figs. 3 and 4. The mount or turret proper consists, essentially, of two reversely-conical frusta, of which the turret 3 is the upper and the carriage 4 the lower, said structures being joined with their bases toward and apexes away from each other, as clearly shown, and having mounted within them upon the trunnion-cheeks 5, resting on the mount-floor 7, the guns 8 in the customary manner. Figs. 1, 2, 3, and 4 all demonstrate that no point of either the interior or exterior of the turret consists of walls having a vertical direction or direction perpendicular to the deck of the vessel, but that at all points they inwardly recede from a perpendicular to said deck at a sharp angularity, preferably not less than a normal angle of forty-five degrees, as shown. It is confidently believed that this universal recedence of the walls renders a given thickness of armor practically equivalent, owing to its deflecting powers, to a relatively much heavier thickness where the structure requires that it be placed perpendicularly.

By reference to Figs. 3 and 4 it will be noticed that the turret is furnished with a gun-room floor 9, ports 10, and roof 11, surmounted by conning-towers 12, substantially of the customary type. The mount is also provided with upper tracks 13 and lower tracks 14, between which run the flanged conical rolls 15.

The base structure sustaining my main-turret framework is arranged in a manner specially devised to meet the requirements of this invention. It consists, essentially, of the supporting-columns 16, having preferably the cross-section shown in Fig. 14 and arranged in a circle at angular distances of forty-five degrees, with their longest section-axes radial to the center of revolution of the turret 3, as shown in Figs. 3 and 4. Upon the tops of these columns 16 is rigidly secured a special tubular device 17, which I term the "turret-pit ring" and which entirely takes the place of the customary gun-bed, consisting of large blocks of metal or other heavy substance. The character of the preferred form of this turret-pit ring is best evident from the view given in Fig. 12. It consists, essentially, of the channels 18 19, bent concentrically to the axis of revolution of the turret, with their flanges outward and united by rivets or otherwise to the bed-plate 20 and cap-plate 21. The turret-pit ring 17 is also integrated to the supporting-columns 16 by the cap-angles 22, secured to each by rivets or other suitable means, and it has secured to its cap-plate 21 the lower track 23 of the gun-mount. The manner in which the flanged conical rolls 15 are interjected between this track 23 and the upper track 24 and the manner of integrating the latter track jointly with the mount-floor 7 and its reinforcing-angles 26 are clearly shown in this same figure, which likewise gives an enlarged detail of the structure of the conical base of the mount, with its side 25 united continuously at all points by the special reinforcing-angles 26 to the mount-floor 7 through the medium of rivets, bolts, or other suitable means. The turret-pit struts are stepped upon projections or flanges 28, extending from and preferably integral with the bed-plate 20 of the turret-pit ring 17. They are superiorly united to said flanges by angles 29, which are inferiorly united to and supported by the large gusset-angles 30, vertically attached in pairs to the duplex channels of the columns 16, with which said gussets laterally register, as shown in both Figs. 12 and 14.

Referring now to Fig. 5 and taking it in conjunction with Figs. 3, 4, and 12, the plan arrangement of the turret-pit ring 17 with respect to the turret-pit struts 27 will be clear. These struts 27, like the supporting-columns 16, have their longest section-axes radial to the axis of revolution of the turret, which causes them to sustain along their longitudinal axes the position of nearly normal lines of force composition to any shocks reaching the turret-base 2 from any position at or intermediate to the point of support of any of these struts, which are rigidly secured at their tops by angles 31 to the turret-base 2, as shown in Figs. 3, 4, and 5 and more particularly in Fig. 9, which details this structure.

The sustaining structure comports, both in plan positions and construction, with the requirements of the turret-pit framing and its inclosed mount, as above described. It consists, essentially, as illustrated in the general views, Figs. 3 and 4, of the supporting or pier columns 16, which are preferably stepped directly over or upon the keel, side keelsons and contiguous substructure being braced to prevent motion of their bottoms by the base-angles 32 and floor-angles 33, secured by rivets or other suitable means to said columns and to the substructure, respectively.

The construction of the supporting-columns 16 is preferably that of an unplated "H-column," as detailed by Fig. 14, this being the lightest form of section capable of withstanding the crushing strains developed; but they may of course be of any of the heavier sections in common use, such as plated "Z-bar columns," &c.

The principal members of the turret-pit framing, comprising, broadly, as already specified in connection with Figs. 5 and 12, the strut 27, radiating from steppings externally from the turret-pit ring 17, are effectively integrated by a special continuous plate 34, called by me the "reaction-ring." The reaction-ring, which, as plainly indicated in Figs. 3, 4, and 9, is shaped like the frustum of an inverted cone, is suitably riveted or otherwise attached interiorly to the struts 27 and exteriorly to the deck-beams 35 by means of angles 36. The reaction-ring 34 not only performs the mechanical agency stated, but its dynamic functions are double. Upon the one hand, it distributes the upward reactions of the downward recoil-shocks reaching the turret-pit ring 17 from the mount and spreads them uniformly over the deck structure by means of its connections to the deck-beam 35 and turret-base by means of the upper connections of the struts thereto. On the other hand, the reaction-ring receives the inward resultants of external shocks sustained by the turret-base 2 and distributes them simultaneously to all parts of said base through the medium of its connections with the struts 27, to the contiguous deck through its connections with the deck-beams 35, and finally to the turret-pit ring 17 and supporting-columns 16 through its lower connections therewith. It will be seen that these functions are valuable in minimizing the effects of all possible shocks to the structure sustaining the mount, whether they be from ordinary operation of the guns or from impacts of armor-piercing shells.

The preferred construction of my turret-base is shown in Fig. 9, by reference to which it will be clear that it consists of the main armor-plate 2ª, interiorly resting against the backing-armor 37, supported by the struts 27, to which they are attached by the angles 31. The backing-armor is made with an inner angular base-section inferiorly plane with the deck, to which it is integrated by large rivets 39 or other suitable means. Similar through-rivets 40 integrate the main armor both with the backing-armor and with the base-armor 41, which forms an obtuse angle in section corresponding, respectively, to the plane of the deck and the inward inclination of the turret. Said base-armor 41 has beveled edges 42 at its top and 43 at its bottom extending completely around its periphery and is additionally secured to the deck by rivets or other suitable fastenings 44, thus completing a stanch continuous conical base for the turret.

The structure of the turret proper (shown in assembled transverse section by Fig. 4 and in longitudinal section by Fig. 5) is more clearly detailed by Figs. 6, 8, and 11, referring to which it will be seen that the mount 4, previously described, is united by interior angles 45 to the backing-plate 46, which in turn supports and is suitably integrated by rivets or bolts with the turret-armor 3ª, having the plan contour described in relation to Fig. 2. This arrangement forms a continuous solid elbow-joint for somewhat more than the one hundred and eighty degrees comprising the first half of the turret, and the projecting rear end of the turret is additionally supported by the stays 47, secured thereto by the angles 48 and secured below to the mount-floor 7 and the gun-room floor 9 in the manner indicated by Fig. 3, said stays 47 having preferably the unplated H-column section shown by Fig. 13. The top of the turret consists of the roof-armor 11, Figs. 6, 7, and 8, preferably sustained by deck-beams 49, directly integrated therewith and also integrated with the backing-plate 46 by angles or other securing members 50. The fore portion of the turret-roof is additionally stiffened by the special continuous angles 51, Figs. 4 and 8, integrated, respectively, with the roof-armor and backing-plate, with the former of which the upper leg of its section is plane and with the latter of which the lower leg is plane. Conning-towers 12, as shown in vertical section by Fig. 6 and in sectional plan by Fig. 7, are attached to the roof-armor 11 over suitable openings 52 therein in the usual manner. The port-holes 10, Figs. 4 and 10, have diametrally-increasing steps 53, 54, and 55, corresponding to the increasing diameter of the jackets of the gun and adapted to fit around said jackets with the least practicable clearance thereof at its various positions of depression and elevation.

Having thus described the structure and operative functions of my invention, what I claim is—

1. Combined in a main turret structure, columns for supporting the turret-pit framing and a tubular turret-pit ring superposed upon the tops of said columns, substantially as described.

2. Combined in a main turret structure, columns for supporting the turret-pit framing, a tubular turret-pit ring superposed upon the tops of said columns, and means for securing said ring to said columns, substantially as described.

3. Combined in a main turret structure, columns for supporting the turret-pit framing, concentrically disposed with reference to the axis of revolution of the turret, a tubular turret-pit ring superposed upon the tops of said columns, and means for securing said ring to said columns, substantially as described.

4. Combined in a main turret structure, columns for supporting the turret-pit framing, concentrically disposed with reference to the axis of revolution of the turret, means for securing the bases of said columns to the hull structure, a tubular turret-pit ring superposed upon the tops of said columns, and means for securing said ring to said columns, substantially as described.

5. Combined in a main turret structure, columns for supporting the turret-pit framing, concentrically disposed with reference to the axis of revolution of the turret, means for securing the bases of said columns to the hull structure, a tubular turret-pit ring concentric with the axis of revolution of the turret superposed upon the tops of said columns, and means for securing said ring to said columns, substantially as described.

6. Combined in a main turret structure, a turret-pit ring, and struts rising therefrom for supporting the turret-base, substantially as described.

7. Combined in a main turret structure, a turret-pit ring, struts rising therefrom for supporting the turret-base, and means for connecting said struts to said ring, substantially as described.

8. Combined in a main turret structure, a turret-pit ring, struts rising therefrom for supporting the turret-base, means for connecting said struts to said ring, and means for securing said struts to said base, substantially as described.

9. Combined in a main turret structure, a turret-pit ring concentric with the axis of revolution of the turret, struts radially disposed about the periphery of said ring and rising at an outward cant to support the turret-base, means for connecting said struts to said ring, and means for securing said struts to said base, substantially as described.

10. Combined in a main turret structure, a tubular turret-pit ring concentric with the axis of revolution of the turret and having integral radial flanges extending therefrom, columns secured to and supporting said ring at the plan location of said radial flanges, gusset-angles secured to said columns beneath said radial flanges, struts canting outwardly stepped upon said flanges, means for integrating said struts, flanges and gusset-angles, and means for securing said struts to the turret-base, substantially as described.

11. Combined in a main turret structure, a tubular turret-pit ring adapted to serve the double purpose of a gun-bed and a base for the turret-pit framing, tracks superiorly attached to said ring, rolls traveling upon said tracks, and a mount traveling rotarily upon said rolls, substantially as described.

12. Combined in a main turret structure, a turret-pit ring, struts connected to and rising from said ring, and a reaction-ring attached to and integrating said struts, substantially as described.

13. Combined in a main turret structure, a turret-pit ring, struts connected to and rising from said ring, columns secured to and supporting said turret-pit ring and struts, and a reaction-ring attached to and integrating said struts, substantially as described.

14. Combined in a main turret structure, a turret-pit ring, struts connected to and rising from said ring, columns secured to and supporting said turret-pit ring and struts, a reaction-ring attached to and integrating said struts, means for attaching said reaction-ring to the deck-beams of the hull, and means for attaching said struts to the turret-base, substantially as described.

15. Combined in a main turret structure, a turret-pit ring, outwardly-canting struts connected to and rising from the periphery of said ring, a reaction-ring formed as the inverted frustum of a conical shell having an axis coincident with the axis of revolution of the turret, means for integrating said reaction-ring with said struts, and means for securing said reaction-ring to the deck-beams of the hull, substantially as described.

16. Combined in a main turret structure, a turret-pit ring, concentric with the axis of revolution of the turret, outwardly-canting struts connected to and rising from the periphery of said ring, a reaction-ring formed as the inverted frustum of a conical shell having an axis coincident with the axis of revolution of the turret, means for integrating said reaction-ring with said struts, means for securing said reaction-ring to the deck-beams of the hull, and means for securing the tops of said struts to the inwardly-inclining, conical turret-base, substantially as described.

17. In a main turret structure, a united three-part or trisectional turret proper, consisting of two end, erect conical semifrusta, and a central erect pyramidal frustum, combined with a subjacent mount secured thereto, substantially as described.

18. In a main turret structure, a united three-part or trisectional turret proper, the same consisting of two end, erect conical semifrusta, and an intermediate erect pyramidal frustum, combined with an attached inverted conical frustum composing the subjacent mount, substantially as described.

19. Combined in a main turret structure, an erect superior conical semifrustum composing the front of the turret proper; an erect pyramidal frustum tangentially secured to said front conical semifrustum; an erect superior conical semifrustum composing the rear of the turret proper, and tangentially attached to the rear of said pyramidal frustum; and an attached inverted inferior conical frustum composing the subjacent mount, substantially as described.

20. A main turret structure comprising the following elements in combination, to wit: an erect conical semifrustum composing the rear of the turret proper; an intermediate pyramidal frustum composing the central part of the turret proper, and secured to the fore part of the said first-named element; an erect conical semifrustum composing the front of the turret proper and secured to the fore part of said secondly-named element; and an inverted conical frustum composing the subjacent mount, and secured to an element of the turret proper, substantially as described.

21. Combined in a main turret structure, two end, erect superior conical semifrusta; a pyramidal frustum secured between said two end conical semifrusta, said three united parts forming the turret proper; an attached subjacent mount consisting of an inverted inferior conical frustum; and a floor secured to the mount on the section plane of the apex end of said inverted frustum, substantially as described.

22. Combined in a main turret structure, two end, erect superior conical semifrusta; an erect pyramidal frustum secured between the said two end conical semifrusta, the three united parts forming the turret proper; a roof fitting flush within the top of the turret so peripherally defined; and an inverted inferior conical frustum secured to the forward one of the said two erect superior conical semifrusta, substantially as described.

23. Combined in a main turret structure, two end, erect superior conical semifrusta; a pyramidal frustum secured between said two end conical semifrusta, the three united parts forming the turret proper; a roof fitting within the top of the turret so peripherally defined; a mount consisting of an inverted inferior conical frustum secured to the forward one of the said erect superior conical semifrusta; a mount-floor secured to the lower part of said inverted inferior conical frustum; and a gun-room floor interposed and secured between said mount-floor and the turret-roof, substantially as described.

24. In a main turret structure, a pyramido-conical turret proper consisting of two end erect superior conical semifrusta, and an intermediate erect pyramidal frustum secured between said two end parts; combined with a conical turret-base adapted to angularly register with the said forward erect conical semifrustum universally at all positions of lateral train, substantially as described.

25. In a main turret structure, a pyramido-conical turret proper consisting of two end erect superior conical semifrusta and an intermediate erect pyramidal frustum secured between said two end parts; combined with a conical turret-base adapted to radially register at a common exterior facial angularity with the forward of the said two conical semifrusta universally at all positions of lateral train, substantially as described.

26. In a main turret structure, a united three-part or trisectional turret proper, the same consisting of two end erect conical semifrusta and an intermediate erect pyramidal frustum, the said parts being secured together; combined with an attached inverted conical frustum composing the subjacent mount; and a conical turret-base adapted to radially register flush at the same facial angularity with the forward one of the said two conical semifrusta universally at all points of lateral train, substantially as described.

27. Combined in a main turret structure, a revoluble pyramido-conical turret proper comprising two end superior conical semifrusta with an intermediately-secured pyramidal frustum and a subjacently-secured mount; a conical turret-base; turret-pit struts; a turret-pit ring; supporting-columns; and means for securing said struts to said columns and to each other, substantially as described.

28. Combined in a main turret structure, a revoluble pyramido-conical turret proper comprising two end superior conical semifrusta with an intermediately-secured pyramidal frustum and a subjacently-secured mount; an inwardly-inclined conical turret-base adapted to radially and facially register with the forward of said superior conical semifrusta at all positions of lateral train; means for securing said subjacent mount to the forward and to the rear of said superior conical semifrusta, respectively; outwardly-inclined turret-pit struts adapted to support the said inwardly-inclined conical turret-base; a reaction-ring adapted to unite said struts in plan position; a turret-pit ring; supporting-columns; gussets adapted to unite said outwardly-inclined turret-pit struts to said supporting-columns; and means for uniting said supporting-columns to said turret-pit ring, substantially as described.

In testimony whereof I have signed my name to this specification in the presence of two subscribing witnesses.

CHARLES H. HOWLAND-SHERMAN.

Witnesses:
EDWIN S. CLARKSON,
C. B. BULL.